(12) United States Patent
Ghannam et al.

(10) Patent No.: US 9,418,301 B2
(45) Date of Patent: Aug. 16, 2016

(54) LOW-SPEED IMPACT DETECTION SENSOR ARRAY

(71) Applicant: Ford Global Technologies, LLC, Dearborn, MI (US)

(72) Inventors: Mahmoud Yousef Ghannam, Canton, MI (US); Abraham G. Philip, Rochester Hills, MI (US); David James Tippy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 14/311,505

(22) Filed: Jun. 23, 2014

(65) Prior Publication Data
US 2015/0371092 A1 Dec. 24, 2015

(51) Int. Cl.
*G06K 9/00* (2006.01)

(52) U.S. Cl.
CPC ........ *G06K 9/00791* (2013.01); *G06K 9/00362* (2013.01); *G06K 9/00805* (2013.01)

(58) Field of Classification Search
CPC .. G06K 9/00791; G06K 9/00798; B60R 1/00; G06T 2207/10016; G08G 1/16
USPC ......................................................... 382/104
See application file for complete search history.

(56) References Cited

U.S. PATENT DOCUMENTS

| | | | | |
|---|---|---|---|---|
| 5,445,412 | A * | 8/1995 | Gillis | B60R 21/0136 180/268 |
| 5,544,716 | A * | 8/1996 | White | B60R 21/0136 180/274 |
| 7,308,380 | B2 | 12/2007 | Tanabe | |
| 2004/0186643 | A1 | 9/2004 | Tanaka et al. | |
| 2005/0278098 | A1* | 12/2005 | Breed | B60R 21/0134 701/45 |
| 2006/0017295 | A1 | 1/2006 | Danisch | |
| 2006/0131900 | A1 | 6/2006 | Lu et al. | |
| 2006/0185923 | A1 | 8/2006 | Tanabe | |
| 2008/0109190 | A1* | 5/2008 | Bauer | B60R 21/0134 702/189 |
| 2008/0304065 | A1* | 12/2008 | Hesser | E01B 35/00 356/400 |
| 2012/0063637 | A1* | 3/2012 | Tardif | G06T 11/00 382/103 |
| 2012/0078499 | A1 | 3/2012 | Park | |

FOREIGN PATENT DOCUMENTS

JP 2006300544 A * 11/2006 ............. G01B 11/16

* cited by examiner

*Primary Examiner* — Gregory F Cunningham
(74) *Attorney, Agent, or Firm* — Frank MacKenzie; Bejin Bieneman PLC

(57) ABSTRACT

A vehicle system has a sensor array and a processing device. The sensor array includes a first group of sensors and a second group of sensors. The sensors of the first group are offset relative to the sensors in the second group. The processing device is configured to determine a general shape of an impact object based at least in part on signals received from the sensor array.

20 Claims, 5 Drawing Sheets

LOW-SPEED IMPACT DETECTION SENSOR ARRAY

BACKGROUND

The New Car Assessment Program (NCAP) was created in 1979 by the US National Highway Traffic Safety Administration. In the United States, NCAP defines a 5-star rating system for vehicles based on impact test data. Companion programs are located throughout the world including Europe (Euro NCAP), Australia and New Zealand (ANCAP), Latin America (Latin NCAP), and China (C-NCAP). The regulations associated with these programs are updated from time to time.

DETAILED DESCRIPTION

An example vehicle system includes a sensor array and a processing device. The sensor array has multiple groups of sensors arranged on strips. The sensors in adjacent strips are offset from one another. Based on signals received from the sensor array, the processing device can determine a general shape of an impact object. From the shape, the processing device can infer what the impact object is and take an appropriate mitigating action. For example, if the processing device determines that the impact object is a pedestrian, the processing device can output signals to, e.g., deploy an external airbag to cushion the impact with the pedestrian.

The system shown in the FIGS. may take many different forms and include multiple and/or alternate components and facilities. The exemplary components illustrated are not intended to be limiting. Indeed, additional or alternative components and/or implementations may be used.

Figure 1:
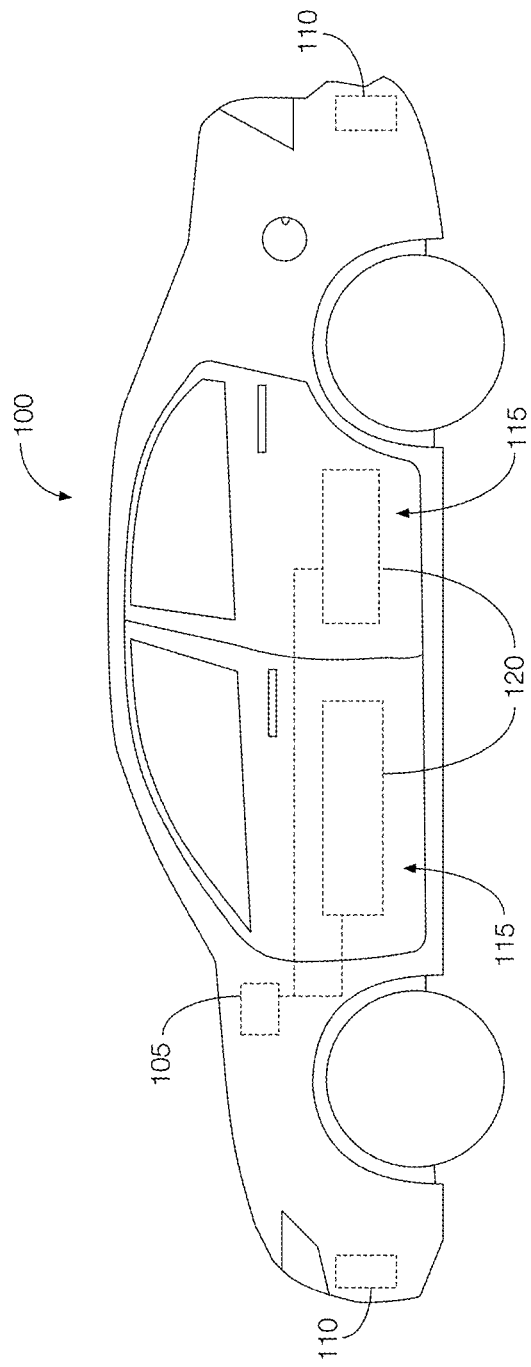
FIG. 1 illustrates an example vehicle having a system configured to detect and determine a shape of an impact object.

Referring to FIG. 1, the vehicle 100 includes a system 105 with arrayed sensors located throughout various areas. Arrayed sensors 120 may be located on a bumper beam 110 or behind door panels 115. For aesthetic reasons, the arrayed sensors 120 may be behind the fascia or otherwise hidden from ordinary view.

The system 105 may be configured to detect an impact and output sensor signals that represent the general shape of the impact object. Any sensor in the array 120 that detects the impact may output a signal. The signals may be aggregated, and the shape of the impact object may be determined from the sensors that output signals. In addition to the location of the impact, the signals output by each sensor may indicate the severity of the impact as determined by that sensor. The system 105 may further attempt to identify the impact object. The system 105 may compare the size and shape of the impact object to the shapes and sizes of known objects. Based on this comparison, the system 105 may determine whether the impact object is a pedestrian.

Although illustrated as a sedan, the vehicle 100 may include any passenger or commercial vehicle such as a car, a truck, a sport utility vehicle, a taxi, a bus, etc. In some possible approaches, the vehicle 100 may be an autonomous vehicle configured to operate in an autonomous (e.g., driverless) mode, a partially autonomous mode, and/or a non-autonomous mode.

Figure 2A:
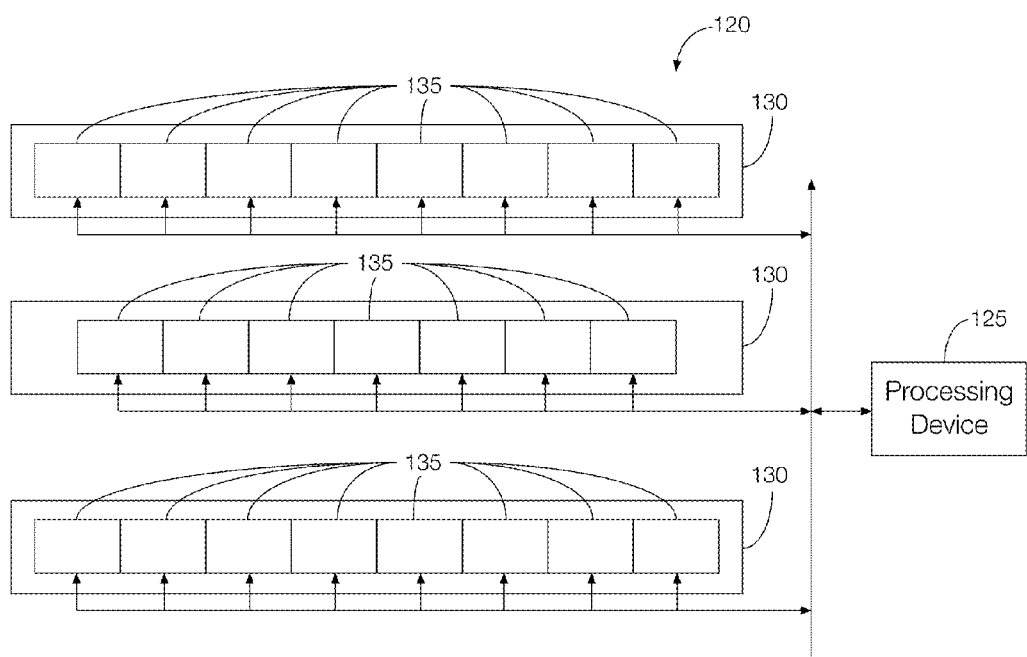
FIGS. 2A and 2B illustrate example sensor arrays that may be used with the system shown in FIG. 1.

FIG. 2A is an example block diagram of the system 105 discussed above with reference to FIG. 1. The system 105, as shown, includes a sensor array 120 and a processing device 125.

The sensor array 120 includes multiple straps 130. The straps 130 may be disposed parallel to one another. In some instances, the straps 130 may be touching. Alternatively, the straps 130 may be spaced from one another. The straps 130 may be attached to the bumper beam 110 or vehicle fascia. For example, the straps 130 may be painted to the bumper beam 110. Another possibility is to mold, adhere, or weld the straps 130 to the fascia.

Sensors 135 may be disposed on each of the straps 130. Each sensor 135 may be, e.g., printed onto one of the straps 130. Each sensor 135 may be configured to output a signal representing a deflection value, acceleration value, pressure value, or the like, in response to an impact. Not all sensors 135 may output a signal following the impact, however. Rather, only those sensors 135 that detect the impact object 140 may output the signal. Therefore, the location of the impact may be determined by the locations of the sensors 135 that output the impact signal. Moreover, the locations of the sensors 135 that output the impact signal may be used to generate an "image" of the impact object 140.

Figure 2B:
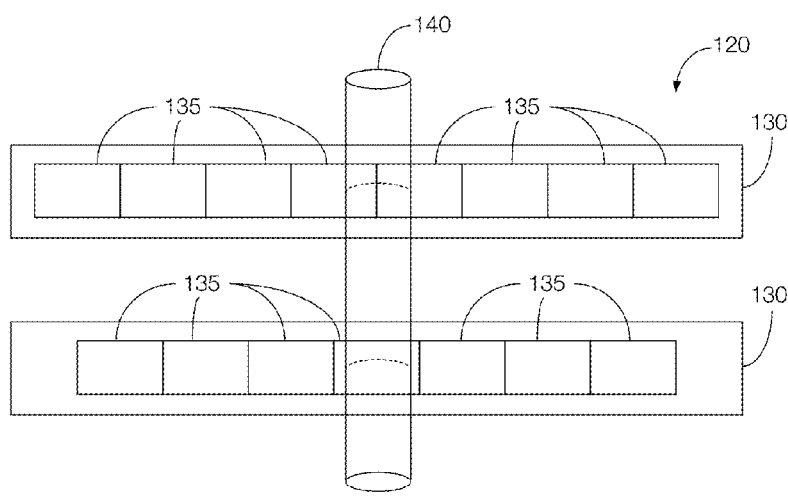

To generate a more precise "image," the sensors 135 on one strap 130 may be offset relative to the sensors 135 on adjacent straps 130. Staggering the sensors 135 from strap to strap gives the system 105 greater "resolution" to generate an image of the impact object 140. Referring now to FIG. 2B, the impact object 140 is detected by sensors 135 in each strap 130. The sensors 135 that detected the impact object 140 output the impact signal, and the general shape and size of the impact object 140 (a cylinder in the example of FIG. 2B) can be determined from the impact signals output by the sensors 135 involved in the impact.

The sensors 135 shown in FIGS. 2A and 2B may be referred to as "patch" sensors 135. Each patch sensor 135 may have a width less than or equal to the diameter of a particular impact object 140. For detecting impacts with pedestrians, the patch sensor 135 may have a width smaller than the diameter of a sample person's leg. The height of each patch sensor 135 may also be based on the size of a sample person's leg.

Figure 3A:
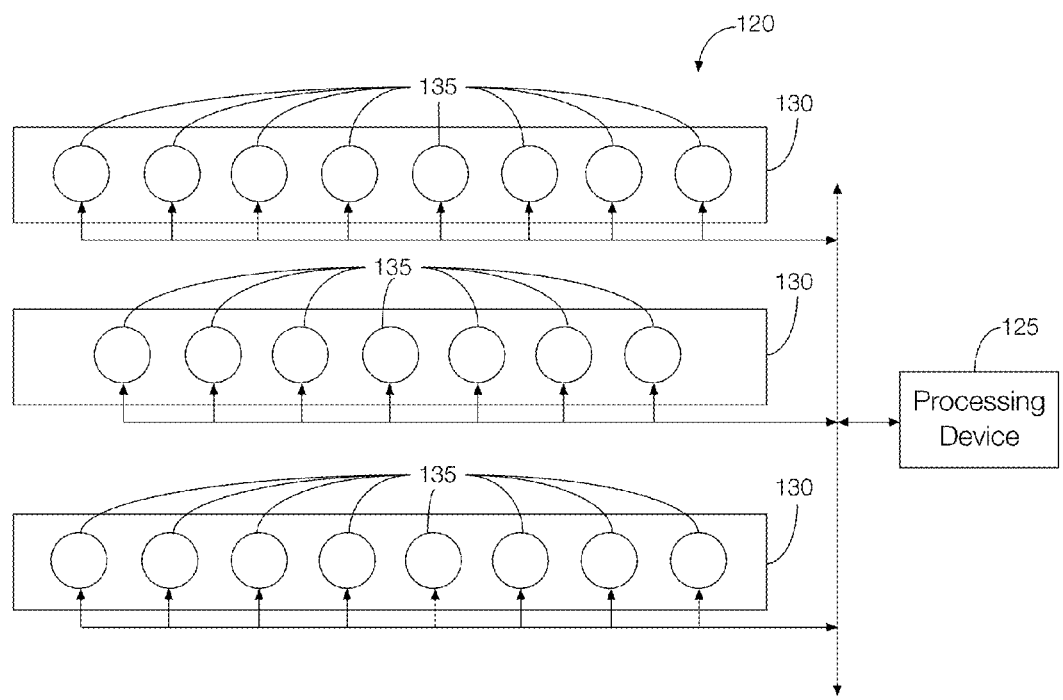
FIGS. 3A and 3B illustrate another example sensor array that may be used with the system.
Figure 3B:
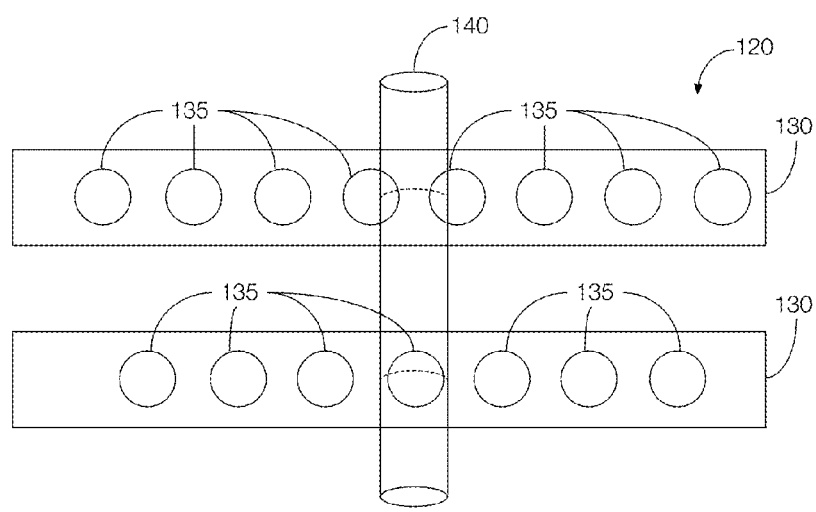

Instead of patches, the sensors 135 may be "node" sensors 135. As shown in FIGS. 3A and 3B, the nodes may be disposed on the straps 130 at regular intervals. The distance between the node sensors 135 on a strip may be a function of the diameter of a sample person's leg. The distance between strips or nodes on different strips may be a function of the size of a sample person's leg. FIG. 3B shows how the node sensors 135 may detect the impact object 140. The node sensors 135 in contact with the impact object 140 (shown as a cylinder) or otherwise affected by the impact will output impact signals.

The processing device 125 may be configured to receive and process the impact signals output by the sensor array 120. From the impact signals, the processing device 125 may determine an impact characteristic such as impact severity and impact location. The processing device 125 may be further configured to determine a general shape of the impact object 140 and, in some instances, even generate an image of the impact object 140. For instance, the processing device 125 can determine which sensors 135 in the sensor array 120 were involved in the impact based on which sensors 135 output impact signals. Moreover, the processing device 125 may determine the shape of the impact object 140 from the particular combination of sensors 135 affected.

With the image, the processing device 125 may compare properties of the impact object 140 to the properties of known objects. Thus, the processing device 125 may determine whether the impact object 140 is a pedestrian. If so, the processing device 125 may output a deploy signal to, e.g., an external airbag system. In response to the deploy signal, the external airbags may deploy to attempt to reduce harm to the pedestrian caused by the impact. The processing device 125 may output other signals in addition to or as an alternative to the deploy signal with the goal of causing an action to attempt to mitigate injury to the pedestrian.

Figure 4:
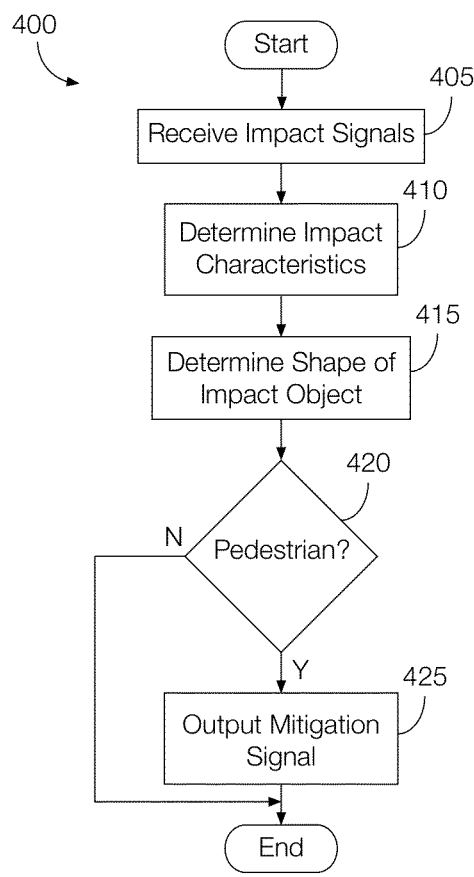
FIG. 4 is a flowchart of an example process that may be executed by the system shown in FIG. 1.

FIG. 4 is a flowchart of an example process 400 that may be implemented by one or more components of the system 105. For instance, the process 400 may be executed by the processing device 125.

At block 405, the processing device 125 may receive the impact signals from the sensor array 120. The impact signals may represent the deflection, acceleration, or pressure measured by one or more sensors 135 in the sensor array 120. The impact signals received may indicate which sensors 135 were involved in the impact.

At block 410, the processing device 125 may determine the impact characteristics. As discussed above, the impact characteristics may include the impact severity and impact location. The impact severity may be determined from the magnitudes of the impact signals received. The impact location may be determined from the sensors 135 involved in the impact.

At block 415, the processing device 125 may determine a shape of the impact object 140. The processing device 125 may determine the shape of the impact object 140 from the impact severity and impact location characteristics determined at block 410. As discussed above, staggering the sensors 135 on one strip relative to neighboring strips may give the processing device 125 higher "resolution" in determining the shape of the impact object 140. In some instances, the processing device 125 may further generate an image of the impact object 140.

At decision block 420, the processing device 125 may determine whether the impact object 140 is a pedestrian. For instance, the processing device 125 may compare the shape of the impact object 140 or the image generated to known shapes and images associated with, e.g., a person's leg. If the similarity between the impact object 140 and the known shapes and images exceeds a predetermined threshold, the processing device 125 may conclude that a pedestrian is likely involved in the impact. If so, the process 400 may continue at block 425. Otherwise, the process 400 may end.

At block 425, the processing device 125 may output a signal in an attempt to mitigate injury to the pedestrian. The signal may cause, e.g., an external airbag to deploy, hopefully cushioning the pedestrian. The process 400 may end after block 425.

Figure 5:
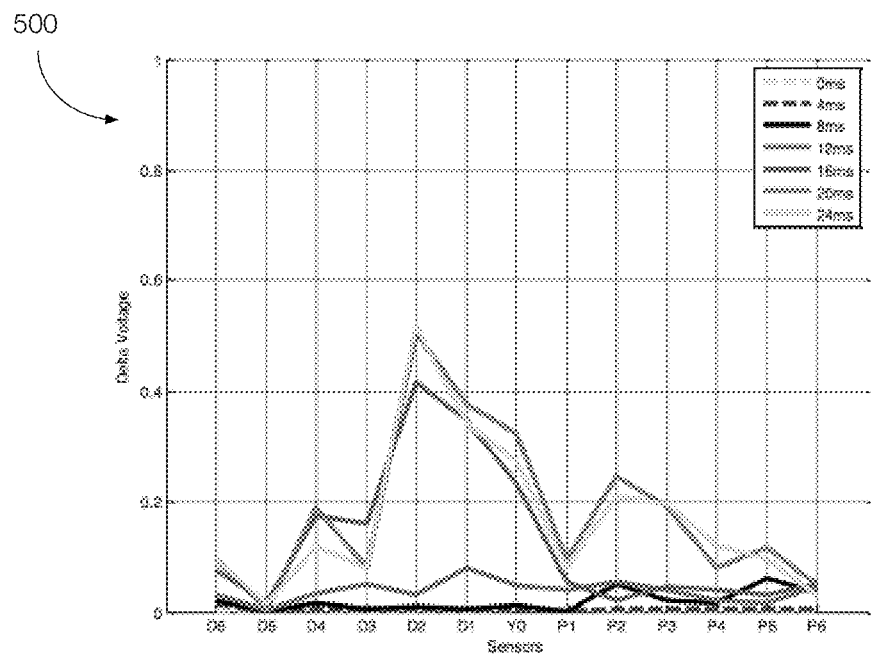
FIG. 5 is a graph illustrating example sensor outputs for an impact object.
Figure 6:
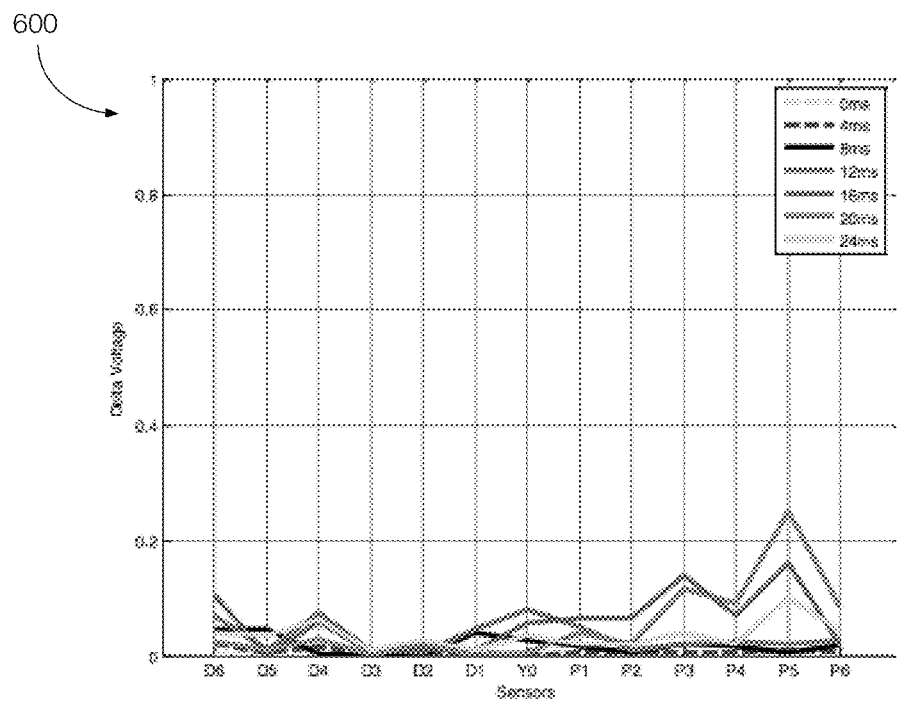
FIG. 6 is a graph illustrating example sensor outputs for another impact object.

FIGS. 5 and 6 illustrate graphs 500, 600 showing different sensor outputs following simulated impacts with impact objects 140 of different sizes and diameters. For instance, in the graph 500 of FIG. 5, the impact object 140 may be a trashcan or another similarly shaped object. Numerous sensors 135 detected the impact as evidenced by the number of sensors 135 that output impact signals. The sensors D2, D1, Y0, and P2 were most significantly impacted in this simulation. The graph 600 of FIG. 6 shows example sensor outputs following a simulated impact with an impact object 140 having a smaller diameter than the trashcan example of FIG. 5. As shown in the graph 600, the impact most affected the sensor P5, and sensors P3, P4, and P6 to a lesser extent. The impact caused by the smaller impact object 140 of FIG. 6, however, was not as deep as the impact caused by the impact object 140 of FIG. 5 as evidenced by the difference in signal outputs.

By simulating collisions with impact objects 140 of different sizes and diameters, the system 105 can guess the type of impact object 140 (e.g., a trashcan, a person's leg, etc.) and take an appropriate remedial action, as previously discussed.

In general, computing systems and/or devices described above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores used with computing devices may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    a sensor array programmed to output a plurality of impact signals representing a vehicle impact with an impact object, the sensor array having a first group of sensors and a second group of sensors, wherein each sensor in the first group is offset relative to each sensor in the second group and wherein each sensor in the sensor array is programmed to output one of the plurality of impact signals in response to the the sensor detecting the vehicle impact with the impact object; and
    a processor programmed to determine a general shape of an impact object based at least in part on the impact signal received from at least one of the sensors in the sensor array.

2. The vehicle system of claim 1, wherein the processor is programmed to generate an image of the impact object.

3. The vehicle system of claim 2, wherein the image is based on an output of at least one sensor from the first group and at least one sensor from the second group.

4. The vehicle system of claim 1, wherein the processor is programmed to determine an impact characteristic based at least in part on the signals received from the sensor array.

5. The vehicle system of claim 4, wherein the impact characteristic includes at least one of an impact severity and an impact location.

6. The vehicle system of claim 1, wherein the sensor array includes a first strip and a second strip.

7. The vehicle system of claim 6, wherein the sensors of the first group are disposed on the first strip and the sensors of the second group are disposed on the second strip.

8. The vehicle system of claim 1, wherein each of the sensors in the first group and the second group includes a patch sensor.

9. The vehicle system of claim 1, wherein each of the sensors in the first group and the second group includes a node sensor.

10. The vehicle system of claim 9, wherein a distance between each node is based at least in part on a diameter of the impact object.

11. The vehicle system of claim 1, wherein each sensor in the first group and the second group is programmed to output a signal representing at least one of a deflection value, an acceleration value, and a pressure value.

12. A vehicle system comprising:
    a sensor array programmed to output a plurality of impact signals representing a vehicle impact with an impact object, the sensor array including a first strip having a first group of sensors and a second strip having a second group of sensors, wherein each sensor in the first group is offset relative to each sensor in the second group; and
    a processor programmed to determine a general shape of the impact object based at least in part on the impact signal received from at least one sensor in the first group and at least one sensor in the second group.

13. The vehicle system of claim 12, wherein the processor is programmed to generate an image of the impact object.

14. The vehicle system of claim 12, wherein the processor is programmed to determine an impact characteristic based at least in part on the signals received from the sensor array.

15. The vehicle system of claim 14, wherein the impact characteristic includes at least one of an impact severity and an impact location.

16. The vehicle system of claim 12, wherein each sensor in the first group and the second group is programmed to output a signal representing at least one of a deflection value, an acceleration value, and a pressure value.

17. A method comprising:
receiving at least one impact signal representing a vehicle impact with an impact object from a sensor array having a first group of sensors and a second group of sensors, wherein the sensors in the first group are offset from the sensors in the second group;
determining an impact characteristic of the impact object based at least in part on the received signal; and
determining a general shape of the impact object based at least in part on the received signal.

18. The method of claim 17, further comprising generating an image of the impact object.

19. The method of claim 17, further comprising:
determining whether the impact object is a pedestrian; and
outputting a mitigation signal if the impact object is a pedestrian.

20. The vehicle system of claim 1, wherein the processor is programmed to determine whether the impact object is a pedestrian and, if the impact object is determined to be a pedestrian, output a deploy signal to deploy an external airbag to cushion the impact with the pedestrian.

* * * * *